United States Patent
Chen et al.

(10) Patent No.: US 8,887,152 B1
(45) Date of Patent: Nov. 11, 2014

(54) ANDROID APPLICATION VIRTUAL ENVIRONMENT

(75) Inventors: Shuhua Chen, Nanjing (CN); Jinzhi Guo, Yangzhong (CN); Yinfeng Qiu, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 403 days.

(21) Appl. No.: 13/289,313

(22) Filed: Nov. 4, 2011

(51) Int. Cl.
*G06F 9/445* (2006.01)

(52) U.S. Cl.
USPC .......................................................... 717/174

(58) Field of Classification Search
CPC .......... G06F 8/60; G06F 8/61; G06F 9/44505
USPC .......................................................... 717/174
See application file for complete search history.

(56) References Cited

U.S. PATENT DOCUMENTS

2014/0007222 A1 * 1/2014 Qureshi et al. .................. 726/16

* cited by examiner

*Primary Examiner* — Anna Deng
(74) *Attorney, Agent, or Firm* — Beyer Law Group LLP (57) ABSTRACT

The behavior of an installed application within the Android device is modified. The program code is modified to allow a security application to load and run the application within its own context. The modified program code is repacked into a modified APK file, executed within the context of the security application. A component within a target application includes APIs for starting other components. These APIs are modified to use a new intent object which points to a proxy component. A modified target application is executed. The security application loads the target application into memory without installing it. The security application includes a component of each type and creates a proxy component instance for each component in the target application. A proxy component under control of the security application is created for each component within the target application. The target application is executed under the control of the security application.

6 Claims, 8 Drawing Sheets

ANDROID APPLICATION VIRTUAL ENVIRONMENT

FIELD OF THE INVENTION

The present invention relates generally to security on mobile devices such as mobile telephones and tablet computers. More specifically, the present invention relates to a virtual environment for improving device security in an Android device.

BACKGROUND OF THE INVENTION

Currently, with the increased demand for mobile devices such as mobile telephones, smart phones, and tablet computers, more attention is being paid to the security of software and data on such devices. While techniques for securing standalone computer servers, desktop and laptop computers from malicious software are fairly well-established, improvements are needed in the security of mobile devices as more of these devices are introduced and as their technology changes.

In particular, as the Android operating system becomes more popular as a platform for mobile telephones, techniques are needed to improve security on this platform and prevent malicious software, or malware, from attacking a mobile telephone. Unfortunately, it can be difficult to implement data encryption, to perform behavior monitoring of software applications and to perform a real-time virus scan on Android platforms because of its operating system limitations. For example, every application in Android runs in a "sandbox" and it has its own private file folder; this is Android security model. No application has root privileges, so one cannot access files in these private folders and monitor their behavior. Therefore, it is difficult to implement this type of security on an Android device.

One technique has been proposed by LG Electronics, Inc. and VMware, Inc. which brings virtualization to an Android telephone. In addition to allowing a mobile telephone to run the Android operating system by default (with the user's personal telephone number), this technique allows an Android telephone to also run virtualization software on top of the native operating system. The virtualization software allows the telephone to have a separate work environment with a separate business telephone number, a separate work profile, and a separate work account run in isolation from the user's personal account. The "work" environment of the telephone would remain separate from the user's personal data, personal application and settings, but the user is able to switch back and forth. Technically, the virtualization environment runs installed applications in a "sandbox" which provides the data isolation.

Unfortunately, any application provider must work closely with the telephone manufacturer in order to gain system-level or even kernel-level access to the telephone. Further, this technique cannot be generally applied to other telephones. In addition, another disadvantage is that because mobile devices typically have limited computing power and memory, the virtualization technology such as this one has a big impact on system performance.

Accordingly, further improvements are needed in this area to provide for better security of more mobile devices while not compromising on performance.

SUMMARY OF THE INVENTION

To achieve the foregoing, and in accordance with the purpose of the present invention, a technique is disclosed that provides a lightweight and powerful virtual environment able to launch other installed applications. This technique allows the behavior and data of these other applications to be monitored and kept under control if desired.

The technique is able to automatically change the behavior of installed applications, including altering their data flows, inserting code at certain key points in the application binary, etc. Thus, the invention allows implementation of many security features such as data isolation, behavior monitoring and URL filtering. At the same time, the invention does not require powerful hardware nor consume a lot of power. Performance is typically the same as running an application directly. The virtual environment is implemented using a standard Android application package file (APK) and may be deployed on any Android platform.

In one embodiment, the behavior of an existing, installed application within the Android device may be modified. A copy of the file representing the application is obtained and unpacked. The program code of the application is modified to allow a security application to load and run the application within its own context. The modified program code is than repacked into a modified APK file which may then be executed within the context of the security application.

In a second embodiment it is determined whether a component within a target application includes APIs for starting other components. If so, these APIs are modified to use a new intent object which points to a proxy component rather than at the component to be started. When the API is called the proxy component is started which in turn starts the component to be started.

In a third embodiment a modified target application is executed within the context of a security application. The security application is installed on the Android device and it loads the target application into memory without installing it. The security application includes a component of each type and it will create a proxy component instance for each component in the target application. In this fashion, a proxy component under control of the security application is created for each component within the target application. The target application may then be executed within the context of, and under the control of, the security application.

Using the above techniques many security features not previously possible on an Android platform may be implemented. In particular, data isolation may be implemented because once the target application is launched (without being installed) within the context of the security application all the data used or gathered by the target application will be stored into the "sandbox" of the security application. In one example, a user uses a first application installed on an Android mobile telephone with personal data. When arriving at an office, the user launches the same application from the security application which will then use and/or generate another set of data isolated from the user's personal data.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

An embodiment of the invention, an installed Android application, acts like a runtime virtual machine. Once launched, this security application can display a screen of all the applications loaded onto the Android device that are under control of the security application. All of these applications are modifications of normal Android applications that have been previously installed onto the Android device, but these modified applications are launched within the virtual environment of the security application, instead of being installed directly into the Android device runtime framework.

Although the security application behaves like a virtual machine, all of the loaded application code launched by the security application runs natively on the Dalvik virtual machine (rather than executing solely within the security application); this is because the security application works on the Java class layer rather than on the instruction-level layer. In other words, the security application, being a normal Android application, does not execute the modify target application itself; the security application uses the Dalvik virtual machine to perform the execution. In addition, all of the data from these loaded applications will be saved into the environment of the security application, leading to easy data protection and data isolation.

Application Installation

Figure 1:
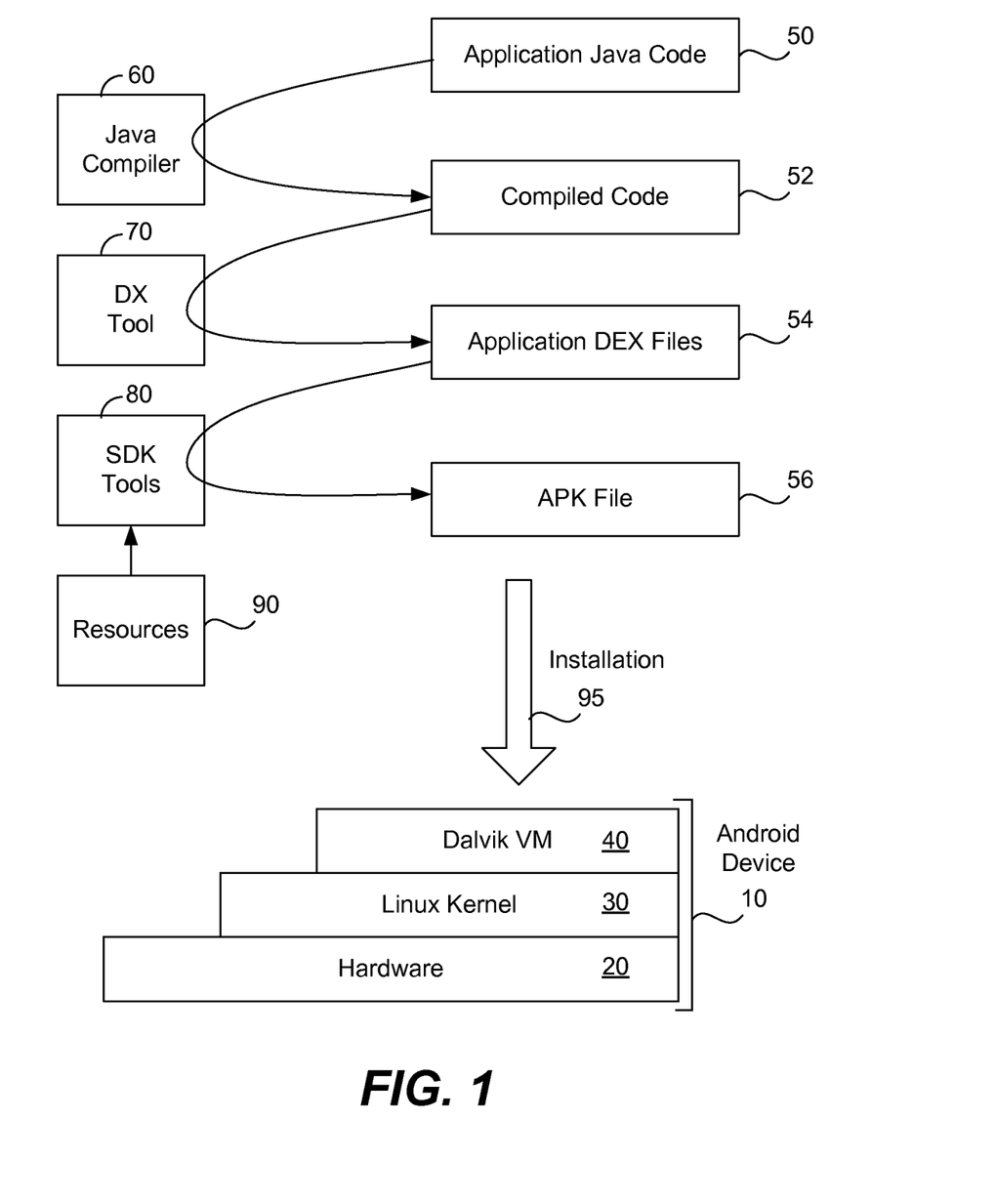
FIG. 1 is a block diagram illustrating a process by which an Android application is prepared and installed upon an Android device.

FIG. 1 is a block diagram illustrating a process by which an Android application is prepared and installed upon an Android device 10. In one embodiment, the security application of the present invention is prepared and installed upon Android device 10 in this manner, although as will be explained in greater detail below, the modified applications to be monitored are loaded but not installed. Shown is a typical Android hardware device 10 (such as a mobile telephone, smart phone, tablet computer, etc.) that includes its required hardware 20, the core of its operating system the Linux kernel 30, and the Dalvik virtual machine 40. Not shown for ease of understanding the present invention are the various drivers of the kernel, the various libraries used by the operating system, the application framework modules such as managers, providers and systems, and any other software applications that might be loaded. One skilled in the art will understand the additional software needed to run an Android device.

All Android applications are written using the Java programming language, including the security application which is originally written using Java code 50. This security application will include Java classes, methods and code necessary to implement the functions described herein, and typically will include one Activity, one Service, one Content Provider and one Broadcast Receiver. As is known in the art, these application components are the four types of components in an Android application. Once the code 50 is compiled using compiler 60 into compiled code 52, a DX tool 70 is used to transform the code into DEX files 54 such as any number of .dex files. Using a Software Development Kit (SDK), a developer then compiles the files along with any data and resources 90 to produce an Android package file 56 (APK). This file 56 is the file that the Android device will use to install the application, in this case, the security application. A process 95 is used by the Android device 10 in order to install the application along with interaction from the user. Preferably, the security application is a legitimate Android application that has been installed and registered within the Android framework.

Architecture

Figure 2:
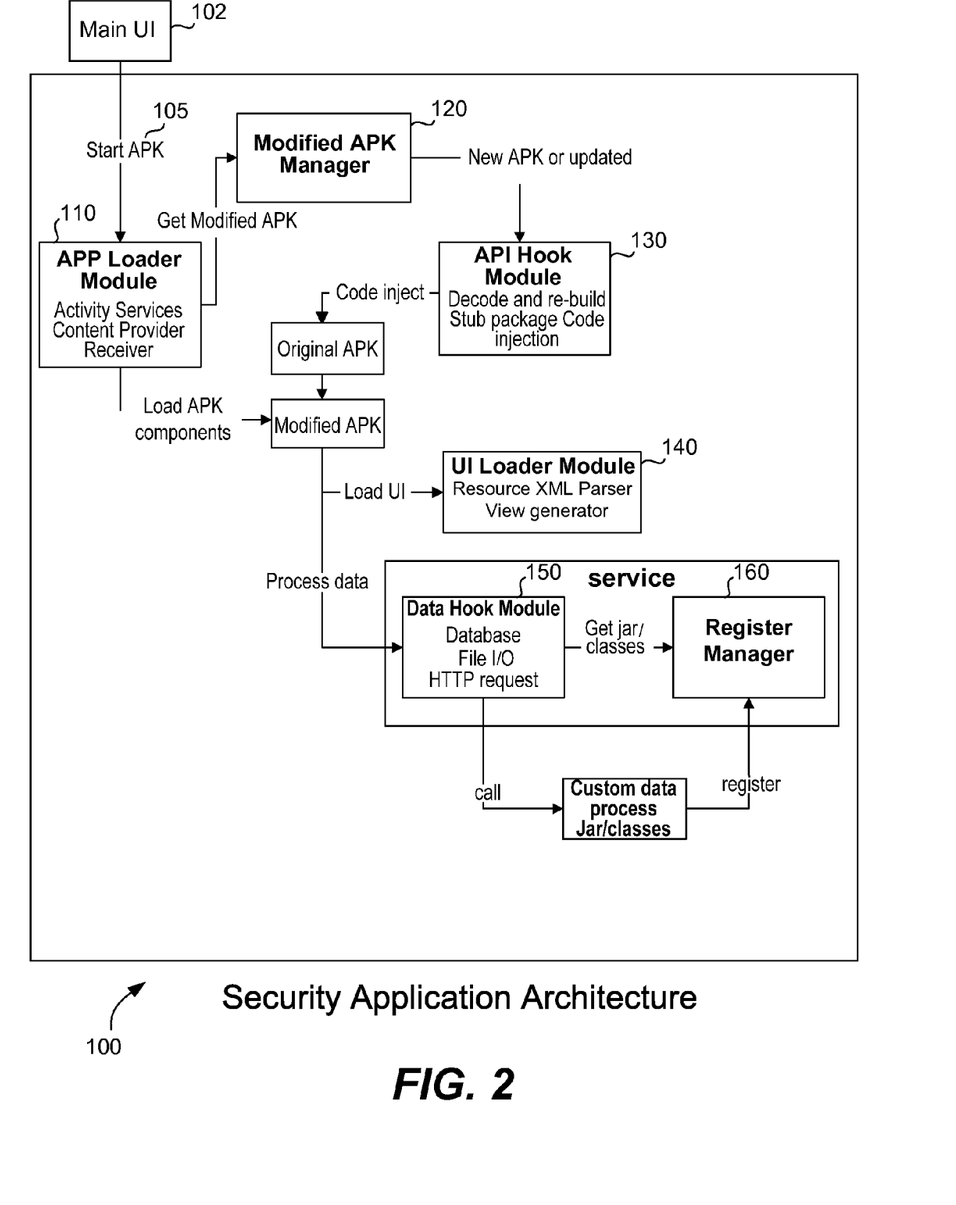
FIG. 2 is a block diagram illustrating the architecture of the security application.

FIG. 2 is a block diagram illustrating the architecture of the security application. Main user interface 102 is the interface of the Android device and a target application to be modified and loaded is represented by "Start APK" 105. APP Loader Module 110 is used to load a target application's components (Activity, Service, Content Provider and Receiver) in the context of the security application. Once loaded, all data of this target application will be stored in the data directory of the security application and will be accessible by the security application. The main function of this module is that the security application creates a proxy component for each type of component in the target application; then, in the proxy component, the actual component instance is created. When the Android framework calls a proxy component's method, the same method of the actual component is called by the proxy component.

Modified APK manager 120 runs as an Android service. This module manages all modified APKs (under control of the security application) paths and versions. If the requested APK is a new APK or an updated version, this module calls API Hook module 130 in order to modify the APK. This module also provides APIs for APP Loader module 110 to retrieve modified APK files. After modifying an APK file, API Hook module 130 registers this APK to the APK Manager 120. The modified APK file and AndroidManifest.xml are passed to APK Manager 120 when registering. APK Manager 120 parses AndroidManiefest.xml file and stores the package meta data. The Meta data include: 1. Activity class name and intent filter; 2. Content Provider class name and authority; 3. Broadcast Receiver class name and intent filter; 4. Service class name and intent filter; 5. DeviceAdminReceiver class name; and 6. Account authenticator and type. These meta data are useful when launching APK components. APK Manager 120 provides methods for other components to retrieve this meta data.

API hook module 130 decodes the target APK, injects code into the decoded APK and rebuilds the package. Preferably, for customization and better performance, this module hooks all loader module 110 and data hook module 150 related APIs. The API hook module 130 includes two parts: code injection, and the hook stub package.

In order to load another target application's components into the context of the security application and in order to hook the other application's data operations, we need to replace the original APIs in the target application with the APIs of the security application, i.e., code injection. The main steps are as follows: first, the module decodes the APK with the Smali assembler/disassembler; second, this module copies the Hook stub package into the decoded APK; third, the API Hook Module 130 parses the APK and modifies the user code; finally, the APK is rebuilt to generate modified APK/dex.

APP loader module 110 will load the target application's components (Activity, Service and Content Provider) into the context of the security application. Thus, all requests to start the target application's components need to redirect to APP Loader module 110. Taking the component Activity as an example, the target application calls Context.startActivity(Intent) to start an Activity. API Hook Module 130 needs to replace the original API with startActivity(Activity, Intent) which is defined by the security application. As the Activity is now loaded by APP Loader 110 but not by the original APK, the resource files need to loaded by UI Loader 140. Functions that are replaced are: startActivity(intent), startActivityForResult(intent, id), startService, bindService, unbindService, Service.stopSelf, stopService, setContentView, and ContentResolver.insert (query/update/delete/getType).

Regarding the hook stub package, the Sandbox stub package includes several functions which are injected into the modified APK. The related original APIs in the target APK are replaced by these APIs defined in the stub package. In order to replace APIs in the Smali files more easily, the APIs in the stub package are static. The Sandbox stub package includes the following functions. For the function "startActivity/startActivityForResult," the target activity is determined by the action and component name in the intent. The actions in intent-filters have already been received in "Parse AndroidManifest.xml." The settings in AndroidManifest.xml for this activity, the activity name, the target activity name and the APK path are added into the intent. For the function "startService/stopService" the target service is determined by the action and component name in the intent. It actually calls the function startService/stopService defined in the bound SandboxService. The settings in AndroidManifest.xml for this service, the service name, the target service name and the APK path are added into the intent. For the function "Service.stopSelf" the service name is retrieved from the input object. The ClassName is obj.getClass( ).getName( ), and the startId is increased in SandboxStub when anyone calls startService. For the function "bindService/unbindService," in the unbindService, the target service is found by the pre-stored instance of the ServiceConnection class from bindService. It actually calls the function bindService/unbindService defined in the bound SandboxService. SandboxStub calls the conn.on ServiceConnected/onServiceDisconnected after the binding and unbinding.

The function "setContentView" is also replaced. For the function "ContentResolver.insert/query/update/delete/getType" the input URI is changed in SandboxStub's corresponding methods. The SandboxStub method inserts the SandboxContentProvider's authority into the URI string just after "content://".

UI loader module 140 provides APIs for loading user interface related resources. The API hook module 130 will replace the original user interface related APIs with the APIs provided by this module. The UI Loader module generates views from XML resource files. These XML resource files can be retrieved by the API in Context class. All XML resource files are preferably pre-compiled. Here is one example. Activity sets its content view by API Activity.setContentView(int id). Next, this API is replaced by the API Hook module 130 with a static function public static void setContentView(Activity activity, int id). Next, the UI Loader 140 retrieves the XML resource file by its identifier, parses it, generates the view, then call the API Activity.setContentView(View view) in order to set the content view.

The data hook module 150 is an Android service and provides a set of data access APIs called by the modified APK. This module is based on the API Hook module 130 which injects stub functions into modified APK packages. These stub functions call APIs exported by the data hook module to process data. The data hook module checks data resources to determine whether this data needs to be processed. If not, the data hook module calls the original APIs to process the data; otherwise it retrieves registered data process "classes/jar" to process the data. This module hooks three types of data: database, file I/O and HTTP requests. The security application does not know which type of data needs to be processed. Other applications or components register callback methods in order to tell the security application which type of data needs to be processed. Because API hooking takes a lot of time, when performing API hooking, these types of data access APIs are hooked.

The register manager module 160 is used when other applications or components register call back methods with the security application in order to process data hooked by the security application that is database, file I/O and HTTP requests. This module provides APIs for other applications or components to register call back methods and manages all registered call back methods. It also provides APIs for the data hook module 150 to retrieve correct call back methods to invoke. This module is an Android service and exports APIs for other components to access.

Figure 8:
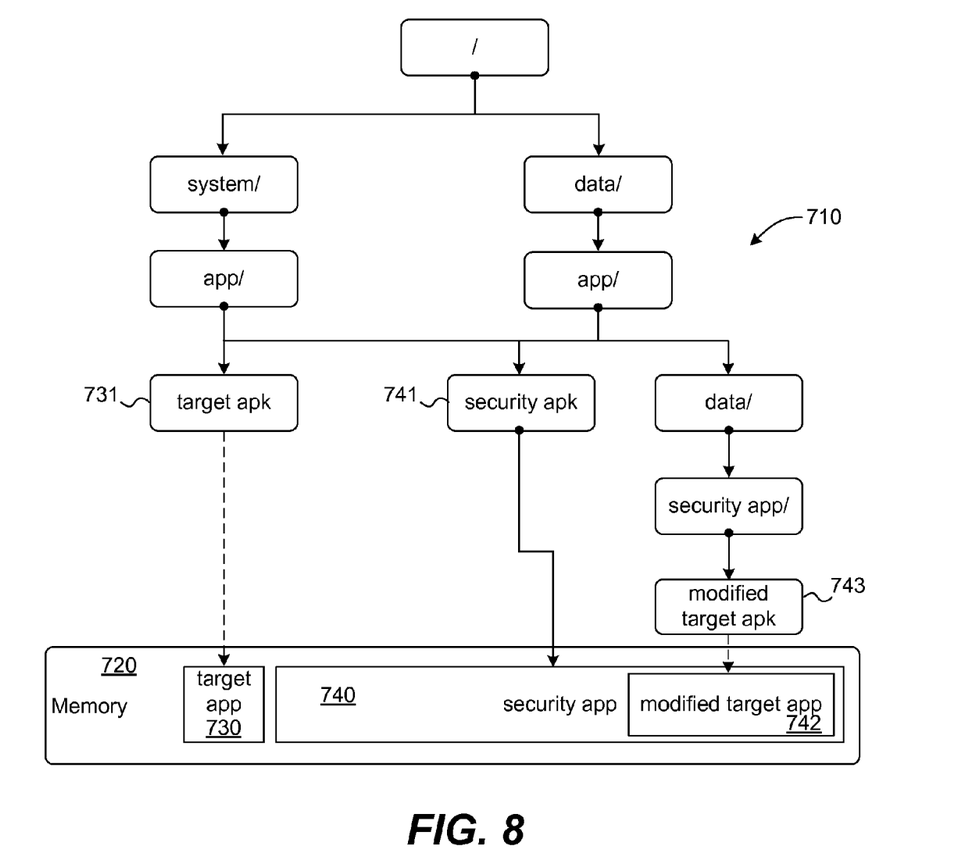
FIG. 8 is a diagram showing the memory of an Android device.

FIG. 8 is a diagram showing the memory of an Android device. Shown is a file system 710 of the device with numerous levels and folders. As shown, an original target application 731 is stored within a memory 720 of the Android device at a location 730. The security application 741 is stored at memory location 740. Once the target application is modified 743, it is stored within memory 720 at location 742 which is within the memory space allocated to the security application 740.

Execute Target Application

Figure 3:
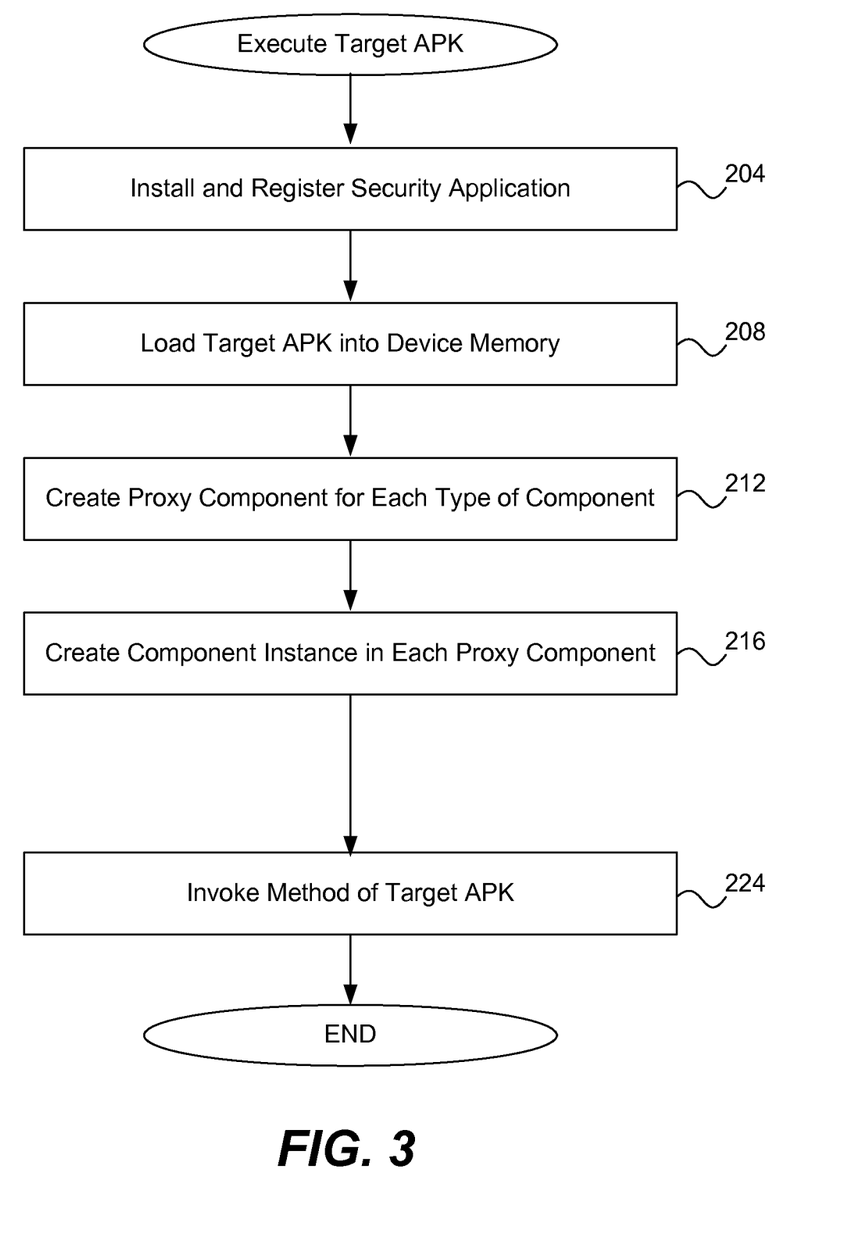
FIG. 3 is a flow diagram describing how a modified target application is loaded and executed within the context of the present invention.

FIG. 3 is a flow diagram describing how a modified target application is loaded and executed within the context of the present invention. In step 204 the security application is installed and registered as a normal Android application. The security application includes functionality to implement the flow diagrams of FIGS. 3, 6 and 7. In one embodiment, the security application is prepared and installed in accordance with the discussion of FIG. 1 above, and includes each of the application components of Android, namely, one Activity, one Service, one Content Provider, and one Broadcast Receiver. Each of these application components will act as a proxy for the corresponding component of a target application to be loaded.

In step 208 the modified target application that is to be executed under control of the security application is loaded into the memory of the Android device from the security application's private file folder. Preferably, the target application has been modified as per the embodiment discussed in FIG. 7 below. Loading is accomplished, for example, by loading the Android package (APK) file into memory using the API "dexClassLoader" which allows the security application to dynamically load an arbitrary APK file as well as have read permission to that file. But, even though the application is loaded, it is not installed.

A class of a file loaded by the Android framework will have all of the context information it needs from the system and will be able to show itself on the screen of the device for use. But, in the present situation the modified target application (and all of its classes) is dynamically loaded by the security application and will simply be an ordinary object in memory without any context information related to the Android framework. As a result, problems arise such as: an Activity loaded by the security application will not appear the screen; a Service will fail to register with the system; a Content Provider will export an incorrect URI; and a Broadcast Receiver will not receive any broadcast. In short, the loaded target application will not function as expected.

An embodiment of the invention uses proxy components in order to solve these problems and in order to execute a target application under control of the security application. As mentioned, each of the four application components loaded by the security application will function as a proxy component (using instances) for the corresponding component in the loaded target application. Accordingly, in step 212 a proxy component for each type of component is created. These four types of components (one Activity, one Service, one Content Provider, and one Broadcast Receiver) may be present in the security application when first loaded or may be created after the security application is installed.

In step 216 the actual component instance is created for each of the proxy components corresponding to the number of components in the target application. Preferably, creation of an instance of a component occurs at runtime when the target application is invoked. For example, if the target application has five Activity components, then at runtime the security application will create five instances of its single Activity component, each corresponding to one of the five Activity components in the target application. Other components are handled in the same way. When the Android framework calls the method of the proxy component, the same method of the actual component will be called by the proxy component. In this fashion, the security application is able to control and monitor target applications that are loaded in this fashion.

In step 224 a method of the target application may be invoked using Java's reflection mechanism to find and invoke the classes and methods. Because proxy component instances have been created, the invoked proxy component instance will forward context information to the dynamically loaded object and will remotely invoke the desired method. For example, the desired method may be a "create" method. Accordingly, the target application will run in the context of the security application and be subject to its control.

Figure 4:
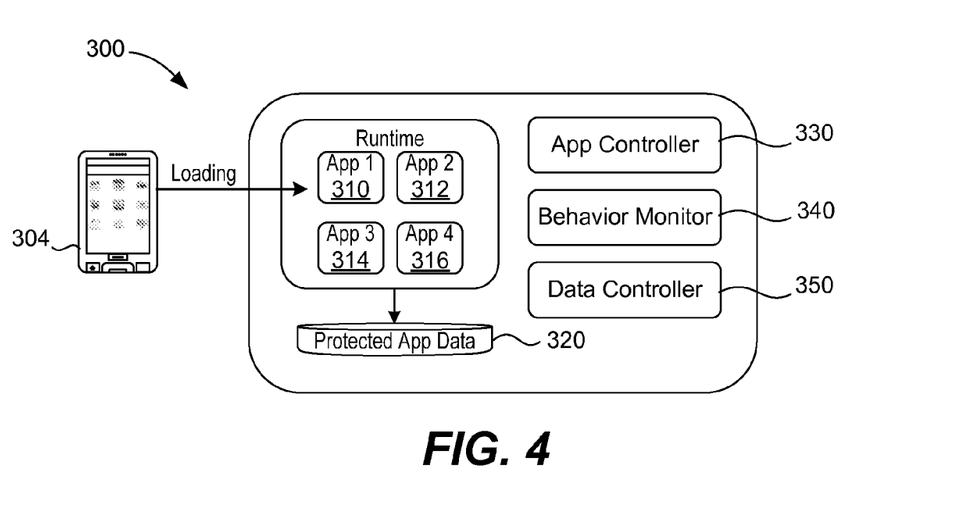
FIG. 4 shows a block diagram of a display of an Android device.

FIG. 4 shows a block diagram 300 of a display of an Android device. Once target applications have been loaded onto the device 304 using the above technique, these applications (four, in this example) appear on the screen as applications 310-316. These applications belong to the security application because they are running in its context through the proxy component instances. Any data used or acquired by these loaded applications will be saved into the database 320 which is a protected database of the security application which provides for easy data protection and data isolation. In other words, any data stored by applications 310-316 will be stored into the data folder belonging to the security application. Further, the user may make use of additional functions 330-350 that are implemented by the security application for purposes of providing security on the Android device.

Modify Component Chain

Figure 5:
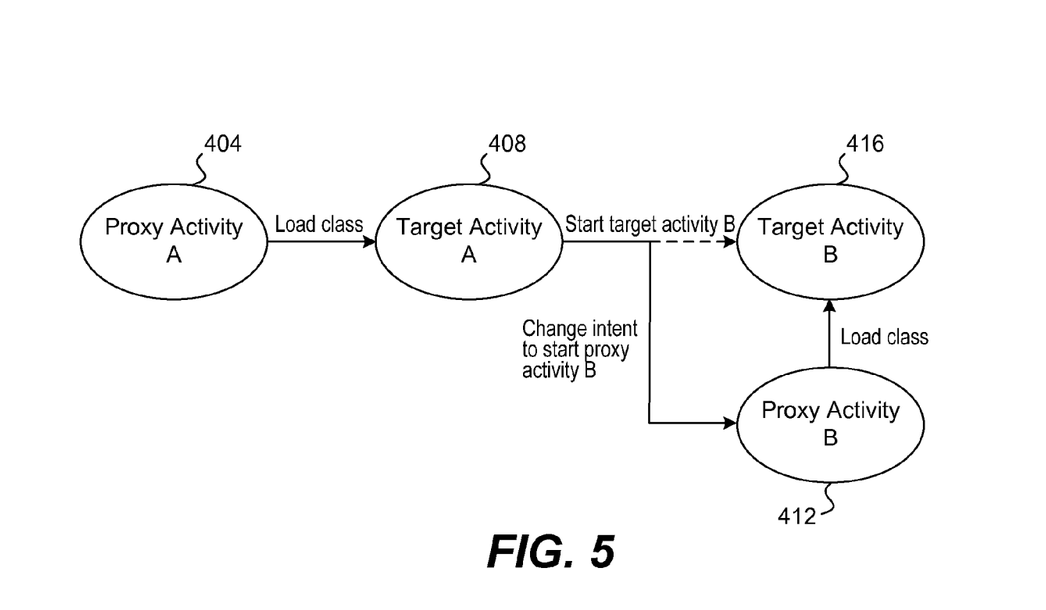
FIG. 5 illustrates a technique for taking control of the calling chain of a target application.

FIG. 5 illustrates a technique for taking control of the calling chain of a target application. This is used to insure that each component of the target application (or each component that might be started) has a proxy component and that therefore the security application can control each component of the target application. If 408 is allowed to start Activity 416 with no intervening proxy, then 416 would be able to perform activities out of the control of the security application. But, if proxy 412 is inserted in the chain, then any API call of 408 to start a new activity will create the proxy 412. Accordingly, any API call to 416 will need to go through proxy 412, thus providing the security application with the means to monitor and control all components of the target application.

Proxy activity A 404 is an instance of the Activity of the security application. It is a proxy for instance 408 of the target application. Instance 408 wishes to start a new Activity 416. But, the security application will intervene and will instead start Proxy Activity B 412 which will then be a proxy for instance 416. FIG. 5 will be explained in FIG. 6, and although FIG. 5 provides an example of starting an Activity, the invention is applicable to starting any of the four types of components.

Figure 6:
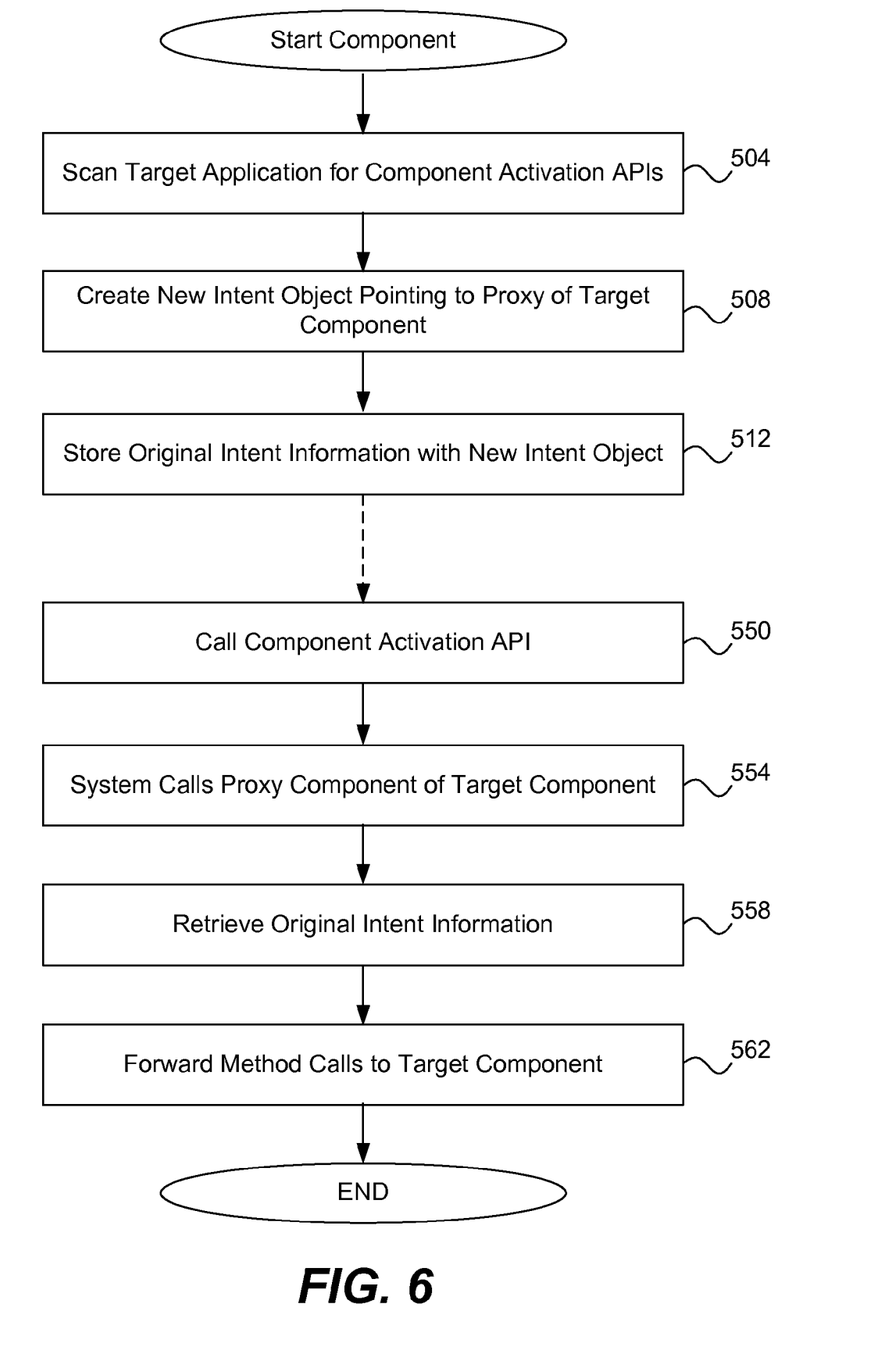
FIG. 6 is a flow diagram describing one technique by which the present invention is able to start a component by taking control of the calling chain.

FIG. 6 is a flow diagram describing one technique by which the present invention is able to start a component by taking control of the calling chain. As known in the art, one application component of Android may start another component, and any application may start any other application's component. Because the Android system runs each application in a separate process, one application cannot directly activate the component from another application, although the Android system can. In order to activate a component in another application, you deliver your message to the system (an Intent) that specifies your intent to start a particular component; the system then starts the component for you. As is known, three of the four component types of Android—Activity, Service, and Broadcast Receiver—are activated by a message called an Intent. The fourth type of component, the Content Provider, is activated when targeted by a request. In order for the security application to maintain control of the target application and to control when one component calls or starts another one, the following technique is used. The technique is applicable to starting the first three types using an Intent, and is applicable to the fourth type using a Request.

Step 504 begins by scanning the target application for any APIs that are used to activate individual components. For example, an Activity may be started by using the API startActivity (Intent intent), specifying the Activity you want to start in the argument named "intent." A Service may be started by using the API startService. A Broadcast may be initiated by using the methods sendBroadcast, sendOrderedBroadcast, or send StickyBroadcast. A query to a Content Provider may be performed by calling the API query. All of these APIs and others are referred to as "component activation" APIs and it is these APIs which are scanned for in the target application. Assume that a single API is found that will attempt to start a target component (such as an Activity, a Service, a Broadcast Receiver, or a Content Provider).

Once an API is (or all APIs are) found in the target application, in step 508 a new intent object is created that points to the proxy of the target component to be started. I.e., the new intent points to object 412. Code in object 408 is also changed to force it to use the new intent, rather than the original intent. In step 512 the original intent information (asking for 416 to be started) is stored as an extra attribute of the new intent object. At this point in time, the preparation has been performed for the time when the API is called to start the new component. Preferably, a new proxy component instance (such as 412) will be used for each new component desired to be started.

When the target application executes, and the API in question is called in step 550, the proxy component instance 412 (of the target component to be started) will be started by the system in step 554. This is because the code in 408 had been changed to start 412 and not 416. In step 558 the original intent information is retrieved from the extra attribute of the new intent, and then instance 412 may start instance 416. Next, in step 562 any method calls to 416 will be forwarded to the new target component using the reflection techniques of Java. In this fashion, the security application maintains control and is able to monitor when a component of a loaded application attempts to start another component.

Modify Target Application

Figure 7:
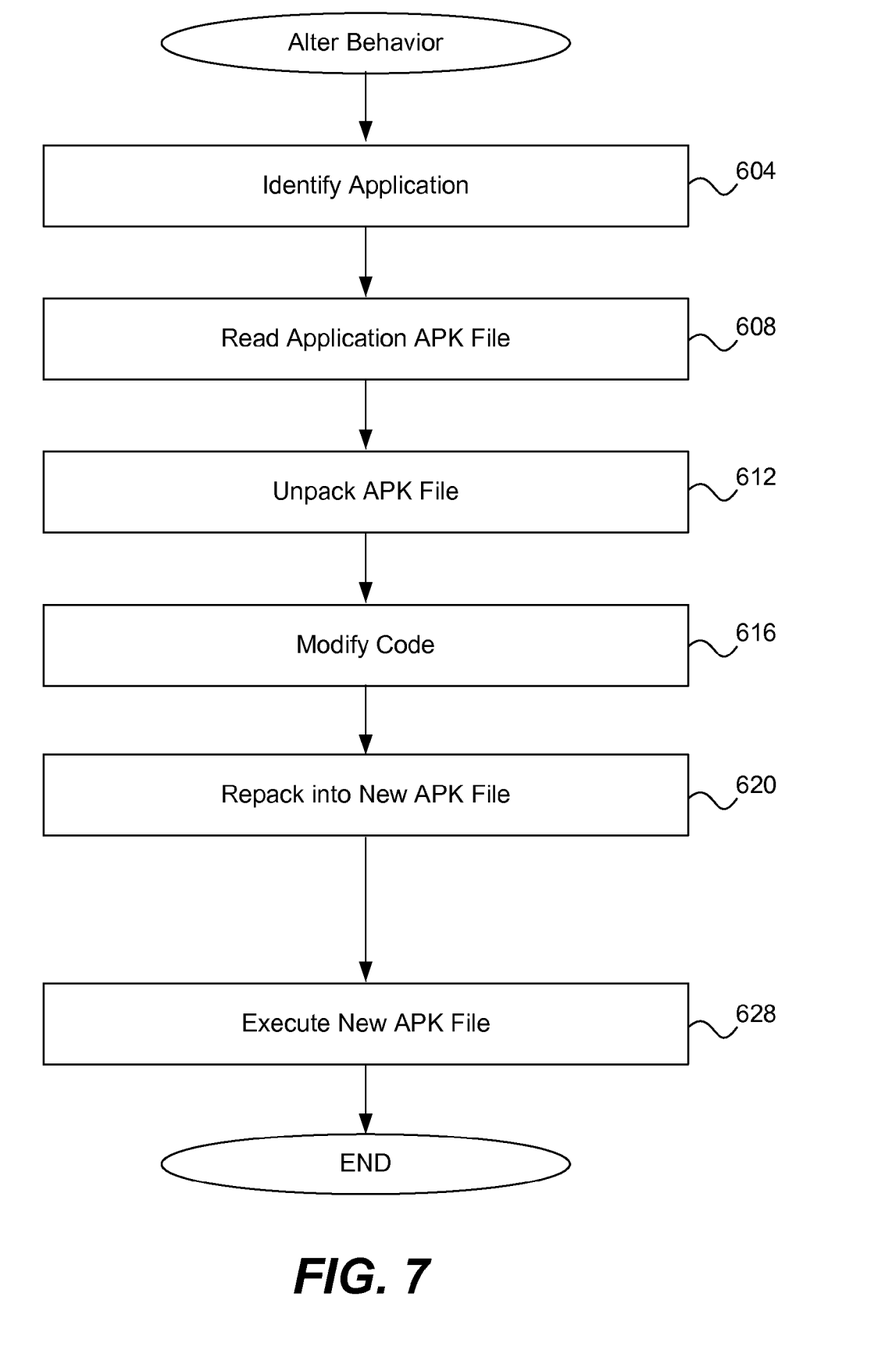
FIG. 7 is a flow diagram describing one embodiment by which the security application alters the behavior of another installed application.

FIG. 7 is a flow diagram describing one embodiment by which the security application alters the behavior of another installed application. It is realized that because Android runs each application in a "sandbox" that code of another application cannot be accessed during runtime. Therefore, the present invention takes the approach of modifying an application's code statically. Because the security application has already been installed, it has read permission of the original APK files of all of the other applications that have been installed, and this permission can be used to modify applications.

This flow diagram is performed before the security application loads and executes the modified target APK as discussed above in FIG. 3. In general, the security application decodes the target APK to generate certain Smali files (outputs of an APK decoding tool called Smali). Then, the security application modifies these Smali files and rebuilds them to generate a new modified target APK file. The content of original target APK file does not change. The modified target APK file is stored in the security application's private file folder. FIG. 7 shows the detailed steps of modifying the original APK.

In step 604 a target application is identified to be modified. The target application has already been installed in the Android device, is stored in a storage area, and it is desired to modify its behavior in order to place it under control of the security application.

In step 608 a copy of the target application is read from its storage location and preferably copied into a memory location from where it can be modified. A copy of the APK file of the target application is typically found in the folder "/system/app" or "/data/app." This APK file is not yet under control of the security application, but after modification it will be.

In step 612 the APK file of the target application is unpacked into its parts. As is known, an APK file typically contains the following folders: a meta-inf directory with a manifest file and certificates; a res directory with resources used by the APK; a manifest file; and classes.dex, all of the classes in DEX format used by the virtual machine; and a resources.arsc file.

In step 616 the code of the DEX classes are modified according to the desires of the user. I.e., the Smali format files are modified. Changes can be made to modify the APK files as discussed above to obtain control over the application. The resource files may be modified as well. In addition, other functionalities can be added. For example, dangerous code can be stopped from executing, malicious URLs can be blocked, code can be inserted to monitor an executing application (e.g., analyze application behavior and generate a report), data can be encrypted or isolated, etc. Specifically, once the API hook module 130 has decoded the target APK, code is injected into the decoded APK and the package will be rebuilt. Also, the data hook module 150 provides a set of data access APIs called by the modified APK.

In step 620 the modified code and the original folders and files of the APK are repacked into a new APK file. Once the security application has finished modifying the target application the modified APK files are stored in the security application's private file folder. Because this modified APK file will be loaded under control of the security application (as per the discussion of FIG. 3), but not installed, the actual name is not important. The original target application represented by the original, unmodified APK files will be under control of the user, but not this new, modified application.

In step 628 the new APK file may be executed with its new functionality. Upon execution, proxy component instances will be created as per FIG. 3, and the flow of FIG. 6 will be executed in order to modify the API calls as discussed above and to create the proxy instances.

Computer System Embodiment

Figure 9A:
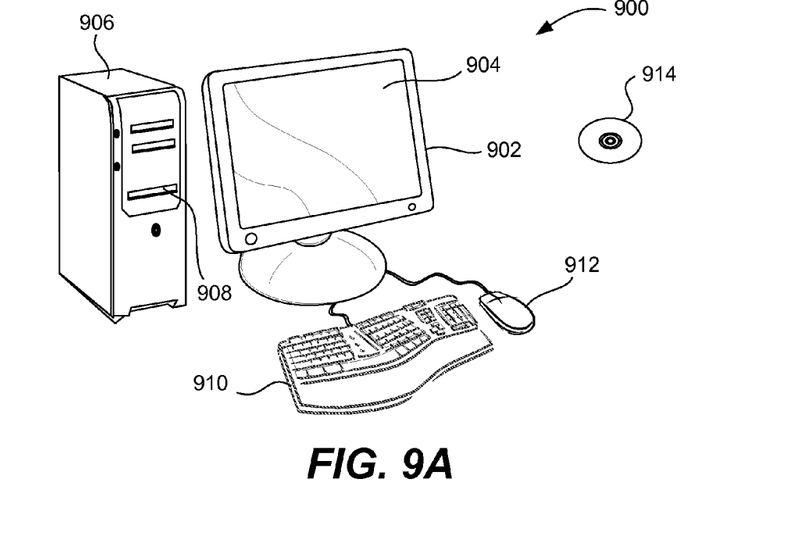
FIGS. 9A and 9B illustrate a computer system suitable for implementing embodiments of the present invention.
Figure 9B:
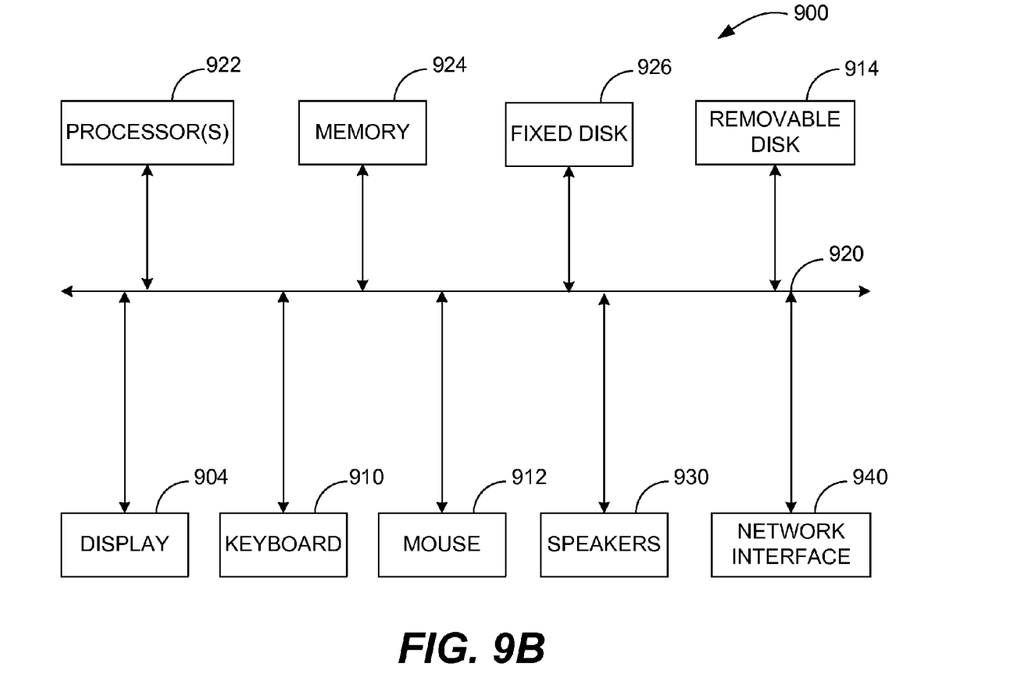

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of executing a target application in the Android operating system, said method comprising:

installing a security application in an Android device under said Android operating system, said security application including a plurality of component types;

loading, under control of said security application, a target application from a storage area in said Android device into a memory of said Android device without installing said target application under said Android operating system;

creating a proxy component instance for each component of said target application, each proxy component instance being an instance of one of said component types of said security application; and remotely invoking a method of said target application using one of said proxy component instances in order to execute said target application in the context of said security application.

2. The method as recited in claim 1 wherein said target application is a modified version of an original application already installed in said Android device.

3. The method as recited in claim 1 wherein said security application includes a Service component type, a Content Provider component type, a Broadcast Receiver component type and an Activity component type.

4. The method as recited in claim 1 further comprising:

intercepting a call from a component of said target application to start a first component;

creating a first proxy component instance of one of said component types; and starting said first component under the control of said first proxy component instance.

5. The method as recited in claim 1 further comprising:

gathering data by said target application; and storing said data in a data folder of said Android operating system belonging to said security application.

6. The method as recited in claim 1 further comprising:

executing code of said target application natively on the virtual machine of said Android operating system.

\* \* \* \* \*